Feb. 26, 1924.
M. I. KLINE
1,485,274
SHOCK ABSORBER FOR VEHICLES
Filed Dec. 23, 1921
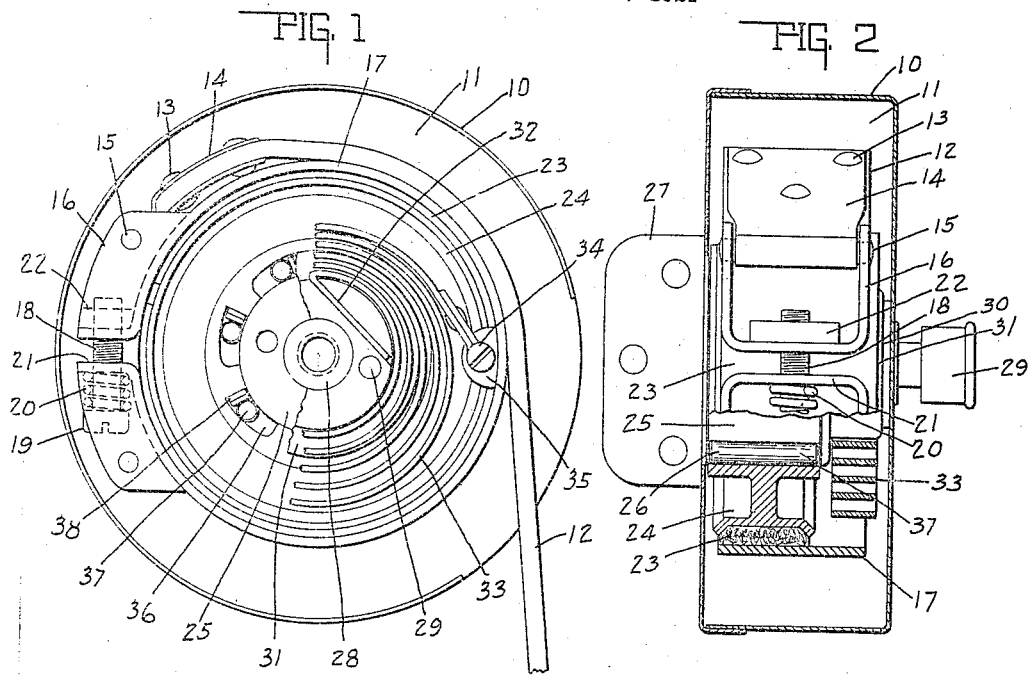
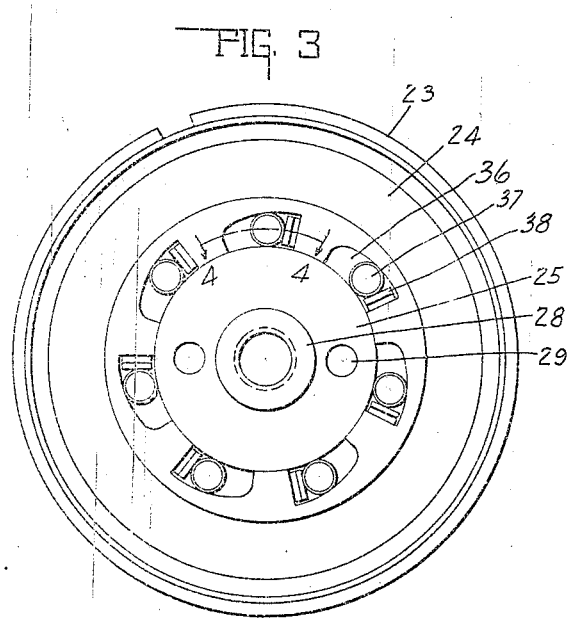
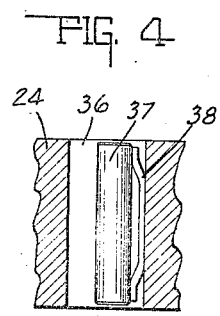
INVENTOR.
MICHAEL I. KLINE.
BY
ATTORNEYS.

Patented Feb. 26, 1924.

1,485,274

UNITED STATES PATENT OFFICE.

MICHAEL I. KLINE, OF INDIANAPOLIS, INDIANA, ASSIGNOR TO AMERICAN METALS CORPORATION, OF INDIANAPOLIS, INDIANA, A CORPORATION.

SHOCK ABSORBER FOR VEHICLES.

Application filed December 23, 1921. Serial No. 524,429.

*To all whom it may concern:*

Be it known that I, MICHAEL I. KLINE, a citizen of the United States, and a resident of Indianapolis, county of Marion, and State of Indiana, have invented a certain new and useful Shock Absorber for Vehicles; and I do hereby declare that the following is a full, clear, and exact description thereof, reference being had to the accompanying drawings, in which like numerals refer to like parts.

This invention relates to a shock absorber for an automobile, and particularly that type of shock absorber commonly termed a snubber or one-way check to snub or check the rebound of a vehicle between the two relatively movable parts, the body and the chassis.

The principal object of this invention is to provide a shock absorber of the snubber or oneway check type, wherein it may be mounted upon the body frame of a vehicle and attached by a flexible strap to the chassis thereof, so that said vehicle will be free to move downwardly toward the chassis through the compression of the body springs. Upon the body springs rebounding from their compression, the flexible strap is drawn taut and prevents the further upward movement of the body, excepting through the frictional movement between parts of the device, said parts comprising concentric rings provided with frictional engaging surfaces, said surfaces frictionally engaging and retarding the upward movement of the body of the vehicle.

Another feature of the invention resides in the roller clutch construction, whereby one of said concentric members will be free to move upon the stationary fixed support in one direction and will be clutched rigidly thereto and prevented from moving in the opposite direction.

The full nature of the invention will be understood from the accompanying drawings and the following description and claims.

In the drawings, Fig. 1 is a side elevation of the shock absorber with a portion thereof removed to show the roller clutch mechanism. Fig. 2 is a front elevation of the front of the casing cut away and the lower portion in vertical section. Fig. 3 is an enlarged view showing a side elevation of the clutch mechanism. Fig. 4 is a section taken on the line 4—4 of Fig. 3.

In the drawings there is shown a shock absorber of the snubber type having an annular casing or housing 10 provided with sides 11 and having an opening in the periphery thereof through which the flexible strap 12 extends. The free end of said flexible strap is attached rigidly to the chassis of a vehicle, and the fixed end secured by means of the bolts or rivets 13 to the connecting member 14 which is pivotally mounted at 15 between the flanges 16 integral with and forming a part of the annular brake shoe 17.

The brake shoe 17 is split, the split ends thereof being adjustably and yieldingly secured together by a threaded adjusting bolt 18 having a head 19 about which there is a yielding spring member 20 mounted between said head and the radially projecting end 21. The threaded portion of the bolt is arranged to screw into a threaded socket formed in the member 22 secured in the oppositely disposed radially projecting end of the shoe 17. By means of this arrangement the diameter of said ring may be increased or decreased for the purpose of tightening it about the friction band and adjusting its frictional contact therewith; while the spring 20 permits it to yield slightly so as to be turned upon the friction band by the applied force of the rebound.

Concentrically mounted with respect to said ring and lying adjacent the inner surface thereof, there is a friction band 23 formed of suitable friction material commonly used upon brake bands and the like, and mounted within said friction band, there is a clutch member or brake drum 24 about which said band and shoe 17 are tightly clamped by the threaded bolt 18.

The clutch member 24 is arranged to revolve upon the hub 25 which is concentrically mounted therein and provided with an annular flange 26 which acts as a thrust bearing for the clutch member 24 and to which there is bolted a securing bracket plate 27 in position to be rigidly bolted or clamped to the frame of the vehicle body. Said thrust bearing flange and securing bracket are mounted upon what may be termed the inner side of the hub, and on the outer side of the hub there is an internally screw-threaded projection 28 into which the grease cup 29 may be screwed.

Mounted over the projection 28 and keyed to the hub 25 by means of the pin 29, there is an annular cap 30 having a flange 31 extending outwardly therefrom so as to cover the clutch mechanism of the clutch member which shall be hereinafter described. Said member is provided with a slot 32 in which one end of the spiral plate spring 33 is embedded for securing one end of said spring to the hub. The other end of the spring 33 is secured to the brake shoe 17 by means of the screw bolt 34 extending through an inwardly extending gear 35 fixed to said shoe.

The inner periphery of the clutch member lying adjacent the periphery of the hub is provided with a clutch construction comprising recesses 36 decreasing in depth in one direction, in each of which there is transversely positioned the roller clutch 37 in position to bear against the outer periphery of the hub 25, whereby when the clutch member 24 is revolved with respect to the hub in one direction, the rollers will move to the deeper ends of the recesses, permitting the free movement of the clutch member with respect to said hub; and when moved in the opposite direction, the rollers will move to the reduced end of the recess so as to be forced into wedging engagement with the surface of the hub and lock the clutch member thereto. For yieldingly maintaining said rollers in engaging position with the surface of the hub, there are provided plate springs 38 between the roller and the deeper end of the recess. Said springs maintain a constantly yielding pressure against said roller, and, because of the reduced depth of the recess, between the roller and surface of the hub, thereby preventing any play between the hub and clutch member upon the reverse movement of the latter. Or in other words while the clutch member is free to move upon the hub in one direction, immediately upon any force being applied thereto exerting it in the opposite direction, the roller clutches will instantaneously lock the clutch member to the hub before any relative movement in that direction can be effected. This is accomplished by means of the springs 37 and is an important feature of the construction of this device.

In operation, when the body of the vehicle moves downwardly relative to the chassis, compressing the body springs, the strap 12 is slackened and taken up by the winding spring 33. Said spring, which is under tension when the body springs are normal, unwinds revolving the brake shoe 17 and the clutch member 24 together about the hub 25. This movement of the clutch member and shoe together is permitted by the roller clutches 37 and winds the strap 12 about the periphery of the shoe. Therefore, the strap 12 is maintained substantially taut throughout the relative positions between the body and chassis. Upon the rebound of the body spring wherein the body moves away from the chassis, the strap 12 retards such movement which can only take place by the frictional slippage between the shoe 17 and the clutch member 24, the frictional resistance between said members being increased or decreased by the adjusting screw 18 and affected by the friction band 23. Inasmuch as this reverse movement of the members causes the clutch rollers 37 to instantaneously take hold of the hub, the clutch member 24 will be locked rigidly thereon, so that the body cannot rebound excepting as the brake shoe 17 frictionally slides about said clutch member. Therefore, this frictional movement will tend to retard the upward or rebound movement of the body, and thereby check or snub it, causing it to gradually seek its normal relation to the chassis and thereby absorb the check which would attend a sudden rebound upon the reflex action of the body springs.

The invention claimed is:

1. A shock absorber for checking the rebound betwen two relatively movable bodies comprising a hub member fixedly secured to one of said bodies, a clutch member rotatably mounted on said hub member, one of said members being provided with recesses therein, a brake shoe surrounding said member, a flexible strap secured at one end to said brake shoe and at the other end to the other relatively movable body, a rotary clutch mounted in one of said recesses in engagement with the surface of the adjacent member so arranged as to permit the free rotary movement of said members in one direction, and prevent such movement in the opposite direction, and a spring mounted in one of said recesses for yieldingly forcing said rotary clutch into clutching engagement with one of said members.

2. A shock absorber for checking the rebound between two relatively movable bodies comprising a hub member fixedly secured to one of said bodies, a clutch member rotatably mounted on said hub member, one of said members being provided with recesses thereon said recesses being decreased in depth toward one end, a brake shoe surrounding said drum in frictional engagement therewith, a flexible member secured at one end to said brake shoe and at the other end to the other relatively movable member, recesses formed in said drum adjacent said hub, rotary clutches mounted in said recesses in engagement with the surface of the adjacent member for permitting the free rotary movement of said member about the other member in one direction and preventing such movement in the opposite direction, and springs mounted in said recesses between said clutches and the deeper ends thereof for yieldingly forcing said clutches into clutching engagement.

3. A shock absorber for checking the rebound between two relatively movable bodies, comprising a fixed member rigidly secured to one of said movable bodies, a clutch member rotatably mounted upon and adjacent said fixed member, a brake shoe surrounding said members, a flexible strap secured at one end to said brake shoe and at the other end to the other relatively movable body, one of said adjacent members having recesses formed therein, said recesses being decreased in depth toward one end, roller clutches mounted in said recesses in engagement with the other adjacent member for permitting the free rotary movement between said adjacent members in one direction and preventing such movement in the opposite direction, and a plate spring mounted in said recesses between said clutch members and the deeper ends thereof for yieldingly forcing said rollers into clutching engagement.

4. A shock absorber for checking the rebound between two relatively movable members, comprising a hub fixedly secured to one of said members, a brake drum rotatably mounted on said hub, a brake shoe surrounding said drum in frictional engagement therewith, a friction band positioned between said shoe and drum, means for yieldingly clamping said brake shoe upon said band and drum, a flexible member secured at one end to said brake shoe and at the other end to the other relatively movable member, recesses formed in said drum adjacent said hub, said recesses being decreased in depth toward one end, roller clutch members mounted in said recesses in engagement with the surface of said hub for permitting the free rotary movement of said drum about said hub in one direction and preventing such movement in the opposite direction, and a plate spring mounted in said recesses between said members and the deeper ends thereof for yieldingly forcing said rollers into clutching engagement with said hub.

5. A shock absorber for checking the rebound between two relatively movable members, comprising a fixed member secured to one of said movable members, a brake member rotatably mounted upon and adjacent said fixed member, a brake shoe surrounding said brake member in frictional engagement therewith, a flexible member secured at one end to said brake shoe, and at the other end to the other relatively movable member, a cap secured on the end of said fixed member having a slot therein, a rewinding spring having one end inserted in said slot and the other end secured to said brake shoe, recesses formed in one of said adjacent members, said recesses being decreased in depth toward one end, roller clutch members mounted in said recesses in clutching engagement with the other adjacent member for permitting the free relative movement of said members in one direction and preventing such movement in the opposite direction, and a plate spring mounted in said recesses between said members and the deeper ends thereof for yieldingly forcing said rollers into clutching engagement.

6. A shock absorber for checking the rebound between two relatively movable members, comprising a hub fixedly secured to one of said members, a brake drum rotatably mounted on said hub, a brake shoe surrounding said drum in frictional engagement therewith, a friction band positioned between said shoe and drum, a bolt for adjustably clamping said shoe upon said band, a compression spring mounted about said bolt for yieldingly maintaining said shoe in clamped position, a flexible member secured to said shoe at one end and to one of said movable members at the other end, a cap rigidly secured over the end of said hub having a slot in the face thereof, a rewinding spring having one end secured in said slot and attached at the other end to an inwardly projecting ear on said shoe, whereby said shoe and drum will be turned about said hub, and clutch means mounted between said hub and drum for permitting said winding spring to turn the shoe and drum about said hub in one direction and lock said drum with said hub for preventing its movement in the opposite direction.

In witness whereof, I have hereunto affixed my signature.

MICHAEL I. KLINE.